Patented Nov. 17, 1925.

1,561,473

UNITED STATES PATENT OFFICE.

HIRAM S. LUKENS, OF PHILADELPHIA, PENNSYLVANIA, ASSIGNOR TO SOLIDIFIER CORPORATION, OF PHILADELPHIA, PENNSYLVANIA, A CORPORATION OF DELAWARE.

COMPOSITION OF MATTER AND METHOD OF MAKING THE SAME.

No Drawing.     Application filed January 24, 1925.     Serial No. 4,426.

*To all whom it may concern:*

Be it known that I, HIRAM S. LUKENS, a citizen of the United States, residing at Philadelphia, in the county of Philadelphia and State of Pennsylvania, have invented a new and useful Improvement in Composition of Matter and Methods of Making the Same, of which the following is a full, clear, and exact description.

My invention relates to the bonding of aggregates with magnesium oxide as a binding agent, and is designed to improve the properties of such articles. I have found that when a wet mixture of aggregates and magnesium oxides is treated with carbon dioxide ($CO_2$), the character of the product is greatly improved and the carbonating of the magnesium oxide may, if continued, be carried through the whole mass of the bound aggregate.

The desired action also takes place whether the $CO_2$ is used in the form of gas or in solution. As examples of my process, the steps may be carried out as follows:

1. By mixing magnesium oxide with any aggregate, whether organic or inorganic with water and then exposing it to the action of $CO_2$ gas.

2. By mixing magnesium oxide with any aggregate whether organic or inorganic with water, the water having been impregnated with $CO_2$ gas, and whether the water be saturated, partly saturated or super-saturated with the gas.

Both of these examples have been definitely tested out by me by actual experiment. Experiments have also been started to show that mixtures of magnesium oxide with various aggregates react in a similar manner by immersing the mixtures, after formation, in water impregnated with $CO_2$ or in water with $CO_2$ gas bubbling through it. The percentage of humidity is also a factor in the gas treatment, along with the rate of change of solution, where the treatment consists in immersing in water with $CO_2$ gas passing through it.

Other materials may be used with the magnesium oxide, but the essential feature lies in the magnesite cement which must form at least the major part of the binder. Also, instead of using $CO_2$ in gaseous form or in water solution, it may be employed in the form of liquid $CO_2$ gas.

I do not intend to limit myself to the above described methods of application of the $CO_2$, but intend to cover it, whether used alone or when dissolved in any medium, whether liquid, solid or gaseous, as well as in water.

I will now describe specific examples of carrying out my process.

*Example 1.*—If soapstone be ground to such size that all of the particles will pass a screen with six meshes to the inch, and this aggregate then be mixed in the dry condition with plastic calcined magnesite in the proportion of 20% of magnesite and 80% of aggregate, by weight, and this mixture then be brought to the consistency of a common mortar by the addition of pure water and at once introduced into an atmosphere of carbon dioxide gas in the presence of water vapor at room temperature, the mass will become hard within a period of twenty four hours and will yield a water insoluble product possessing a tensile strength of about 110 lbs. per square inch. On allowing the material to dry in the air, the product increases in strength to about 175 lbs. per square inch in the course of 24 hours.

*Example 2.*—Aggregates mixed with plastic calcined magnesite, in the proportion of 10% of magnesite and 90% of aggregate by weight, and then made to the consistency of a common mortar with water saturated with carbon dioxide, will become hard within 24 hours and exhibit a tensile strength in excess of 100 lbs. per square inch.

On immersing such materials in water for five to seven days and then allowing to dry, such materials exhibit a further increase in tensile strength.

I am aware that it has been proposed to carbonate lime as a binder; but if this is done at atmospheric pressure, the resulting material is very weak and friable; while my process gives, at atmospheric pressure, an article of good structural strength and commercial value. If pressure in excess of an atmosphere are used in my process, as has been proposed in the use of calcium carbonate bonds, a much stronger article results. My invention is therefore based upon the specific difference between the action of magnesium and that of other elements such as calcium, when the oxide thereof is converted into a carbonate as a bond for aggregates.

I claim:

1. In the manufacture of artificial stone, the steps consisting of forming a wet mixture of aggregate other than ores of metals and a binder substantially all of which consists of magnesium oxide with sufficient water to form a plastic mass, and carbonating the mixture while wet to convert the oxide into magnesium carbonate.

2. As a new article of manufacture, artificial stone, comprising a pulverulent aggregate other than ores of metals cemented together by a binder, substantially all of which consists of magnesium carbonate chemically formed in place from magnesium oxide in a wet plastic mixture of the aggregate and binder, said stone having the strength generally required in building materials and being resistant to the passage of heat and electricity.

In testimony whereof I have hereunto set my hand.

HIRAM S. LUKENS.